US012752881B2

(12) United States Patent
Paick et al.

(10) Patent No.: US 12,752,881 B2
(45) Date of Patent: Oct. 6, 2026

(54) APPARATUS AND METHOD FOR DRIVING ELECTRIC BICYCLE

(71) Applicant: HL MANDO CORPORATION, Pyeongtaek (KR)

(72) Inventors: In Ha Paick, Seoul (KR); Seung Kyung Lee, Anyang (KR); Kyung Ho Hong, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 1062 days.

(21) Appl. No.: 17/748,035

(22) Filed: May 19, 2022

(65) Prior Publication Data

US 2023/0373590 A1 Nov. 23, 2023

(51) Int. Cl.
*B62M 6/50* (2010.01)
*B62M 6/45* (2010.01)

(52) U.S. Cl.
CPC .................................... *B62M 6/50* (2013.01)

(58) Field of Classification Search
CPC . B62M 6/40; B62M 6/45; B62M 6/50; B62M 6/55; B62M 6/60; B62M 6/65
See application file for complete search history.

(56) References Cited

U.S. PATENT DOCUMENTS

| | | | | |
|---|---|---|---|---|
| 5,992,553 A * | 11/1999 | Morrison | B62M 6/45 180/220 |
| 11,701,536 B2 * | 7/2023 | Fuchs | A63B 21/0054 482/2 |
| 11,926,392 B2 * | 3/2024 | Paick | B60L 15/20 |
| 2012/0226400 A1 | 9/2012 | Hsu | |
| 2014/0081495 A1 * | 3/2014 | Son | B60L 15/2045 701/22 |
| 2015/0019062 A1 | 1/2015 | Previdi | |
| 2016/0318583 A1 * | 11/2016 | Watarai | B62M 25/08 |
| 2016/0362021 A1 | 12/2016 | Sveje | |
| 2020/0115003 A1 * | 4/2020 | Keppens | B62M 11/18 |
| 2021/0252994 A1 * | 8/2021 | Cerundolo | B60W 10/08 |
| 2022/0194517 A1 * | 6/2022 | Nelson | B62M 25/04 |
| 2024/0199169 A1 * | 6/2024 | Obayashi | B60L 15/209 |

FOREIGN PATENT DOCUMENTS

| | | | |
|---|---|---|---|
| CN | 106414152 | A | 2/2017 |
| DE | 102013214169 | A1 | 1/2015 |
| EP | 3360769 | A1 | 8/2018 |
| FR | 3104538 | A1 | 6/2021 |
| JP | H07143603 | A | 6/1995 |
| JP | 2018-030543 | A | 3/2018 |
| KR | 20120129064 | A | 11/2012 |
| KR | 101896022 | B1 | 9/2018 |
| WO | 2015007423 | A1 | 1/2015 |
| WO | 2021116353 | A1 | 6/2021 |

OTHER PUBLICATIONS

KR Office Action dated May 26, 2025.
Office Action From Chinese Patent Office, Aug. 19, 2025.

* cited by examiner

*Primary Examiner* — Anne Marie M Boehler
(74) *Attorney, Agent, or Firm* — Harvest IP Law, LLP

(57) ABSTRACT

The present disclosure relates to a boosting mode of an electric bicycle, and has the effect of enabling safe operation of the electric bicycle while providing a necessary acceleration force by preventing a sudden acceleration not intended by a user by double determining the user's intention when rapid acceleration is required, such as when starting or overtaking an electric bicycle.

8 Claims, 7 Drawing Sheets

APPARATUS AND METHOD FOR DRIVING ELECTRIC BICYCLE

TECHNICAL FIELD

The present disclosure relates to an electric bicycle, and more particularly, to a technology for boosting driving of an electric bicycle without a chain.

BACKGROUND

Electric bicycles use electricity to turn a motor to assist human force or to drive a bicycle. A mode in which a power of motor assists a force that a person steps on pedals to drive wheels is called a PAS (Pedal Assistance System) mode, and a mode in which the wheels are driven only by the power of the motor by pulling the handle is called a throttle mode.

Since the throttle mode moves the electric bicycle only with the power of the motor, there is no need for a pedal or a chain for transmitting the force of the pedal like a conventional bicycle. However, since people feel awkward about bicycles without pedals, there are also electric bicycles that use chainless bicycles to charge the battery by turning the pedals.

Chainless electric bicycles recognize the speed at which the user turns the pedals and control the speed of the motor in proportion to the speed. The pedals are not chained, so no load is applied to them. Therefore, in order to create a feeling of pedal load like a bicycle with a chain, a generator connected to the pedal is controlled. If the load on the pedal is controlled according to the speed of the electric bicycle, the user will feel the pedal feeling similar to that of a regular bicycle with a chain.

However, if a pedal feel similar to that of a bicycle with a chain is created on an electric bicycle without a chain, there is a problem that much greater power than normal driving is required when acceleration is required for a sudden start or overtaking.

The inventors of the present disclosure have been researching and trying to solve the driving problem of such a related art chainless electric bicycle. The present disclosure has been completed after much effort in order to complete an electric bicycle that can obtain a desired sense of acceleration without applying a large amount of force when rapid acceleration (boosting) driving is required.

SUMMARY

Technical Problem

The present disclosure is directed to providing an apparatus and method for controlling a boosting mode that enables safe electric bicycle operation while providing convenience to users by providing the boosting mode when rapid acceleration is required, such as when starting or overtaking an electric bicycle.

Meanwhile, other aspects not specified of the present disclosure will be additionally contemplated within the range that can be easily inferred from the following detailed description and effects thereof.

Technical Solution

An apparatus for driving an electric bicycle according to an aspect of the present disclosure includes a pedal sensor for measuring a position or speed of a pedal; a wheel sensor for measuring a position or speed of a driving wheel; and a driving controller for controlling a speed of a motor for driving the driving wheel according to a position difference or speed difference between the pedal and the driving wheel; wherein the driving controller increases a control current of the motor in a boosting mode set by a user's boosting control for a certain period of time compared to a previous driving.

The driving controller may increase the control current of the motor in proportion to the speed of the electric bicycle in the boosting mode.

The driving controller may limit the current of the motor so that the speed of the electric bicycle does not exceed a predetermined maximum speed in the boosting mode.

The driving controller may increase the increasing current of the motor for a predetermined first time after the start of the boosting mode and decrease it for a predetermined second time before the end of the boosting mode.

An apparatus for driving an electric bicycle according to another aspect of the present disclosure includes a pedal sensor for measuring a position or speed of a pedal; a wheel sensor for measuring a position or speed of a driving wheel; and a driving controller for controlling a speed of a generator for driving the driving wheel according to a position difference or speed difference between the pedal and the driving wheel; wherein the driving controller decreases a control current of the generator in a boosting mode set by a user's boosting control for a certain period of time compared to a previous driving.

The driving controller may limit the current of the generator so that the speed of the electric bicycle does not exceed a predetermined maximum speed in the boosting mode.

The driving controller may decrease the decreasing current of the generator for a predetermined third time after the start of the boosting mode and increase it for a predetermined fourth time before the end of the boosting mode.

The driving controller may control a boosting control button of the electric bicycle to be pressed for a predetermined time or longer, and enter the boosting mode only when a speed of the pedal measured by the pedal sensor becomes faster than before the boosting control button is pressed.

The driving controller may control the boosting mode not to operate for a predetermined time after controlling the boosting mode for the certain period of time.

The driving controller may stop the boosting mode when a speed of the pedal measured by the pedal sensor is 0 or the operation of a brake lever of the electric bicycle is detected.

In addition, a method for driving an electric bicycle according to an aspect of the present disclosure includes measuring a position or speed of a pedal; measuring a position or speed of a driving wheel; determining a speed of a motor for driving the driving wheel based on a position difference or a speed difference between the pedal and the driving wheel; generating a motor current for controlling the motor at the determined speed; determining whether it is a boosting mode for acceleration; and generating an additional current of the motor for acceleration if the determination result is a boosting mode.

The generating an additional current of the motor may include generating the additional current of the motor in proportion to the current speed of the electric bicycle.

The generating an additional current of the motor may limit the additional current of the motor so that the speed of the electric bicycle does not exceed a predetermined maximum speed.

The generating an additional current of the motor may increase the current of the motor for a predetermined first time after the start of the boosting mode and decrease it for a predetermined second time before the end of the boosting mode.

A method for driving an electric bicycle according to another aspect of the present disclosure includes measuring a position or speed of a pedal; measuring a position or speed of a driving wheel; determining a speed of a generator for driving the driving wheel based on a position difference or a speed difference between the pedal and the driving wheel; generating a generator current for controlling the generator at the determined speed; determining whether it is a boosting mode for acceleration; and generating a reduced current of the generator if the determination result is a boosting mode.

The generating a reduced current of the generator may limit the reduced current of the generator so that the speed of the electric bicycle does not exceed a predetermined maximum speed.

The generating a reduced current of the generator may decrease the current of the generator for a predetermined third time after the start of the boosting mode and increase it for a predetermined fourth time before the end of the boosting mode.

The determining whether it is a boosting mode may control a boosting control button of the electric bicycle to be pressed for a predetermined time or longer, and determine as the boosting mode only when a measured speed of the pedal becomes faster than before the boosting control button is pressed.

The determining whether it is a boosting mode may do not enter the boosting mode if a predetermined time has not elapsed after the end of a previous boosting mode.

The generating an additional current of the motor or the generating a reduced current of the generator may do not generate the additional current of the motor or the reduced current of the generator and stop the boosting mode when a speed of the pedal is 0 or the operation of a brake lever of the electric bicycle is detected.

Advantageous Effects

According to the present disclosure, it is possible to provide a safe and convenient boosting mode by operating the boosting mode by checking a user's intention in two or more steps when the user needs it.

In the meantime, even if there is an effect not explicitly specified herein, it is added that the effects expected by the technical features of the present disclosure and described effects and provisional effects thereof in the following specification are regarded as described in the specification of the present disclosure.

The accompanying drawings are exemplified by reference for understanding the technical idea of the present disclosure, and the scope of the present disclosure is not limited thereto.

DETAILED DESCRIPTION OF THE EMBODIMENTS

Hereinafter, a configuration of the present disclosure guided by various embodiments of the present disclosure and effects resulting from the configuration will be described with reference to the drawings. In describing the present disclosure, when it is determined that a detailed description of a related known function obvious to those skilled in the art may unnecessarily obscure the subject matter of the present disclosure, the detailed description thereof will be omitted.

Terms such as 'first' and 'second' may be used to describe various elements, but, the above elements should not be limited by the terms above. The above terms may be used only for the purpose of distinguishing one element from another. For example, without departing from the scope of the present disclosure, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present disclosure may be interpreted as meanings commonly known to those of ordinary skill in the art.

Hereinafter, a configuration of the present disclosure guided by various embodiments of the present disclosure and effects resulting from the configuration will be described with reference to the drawings.

Figure 1:
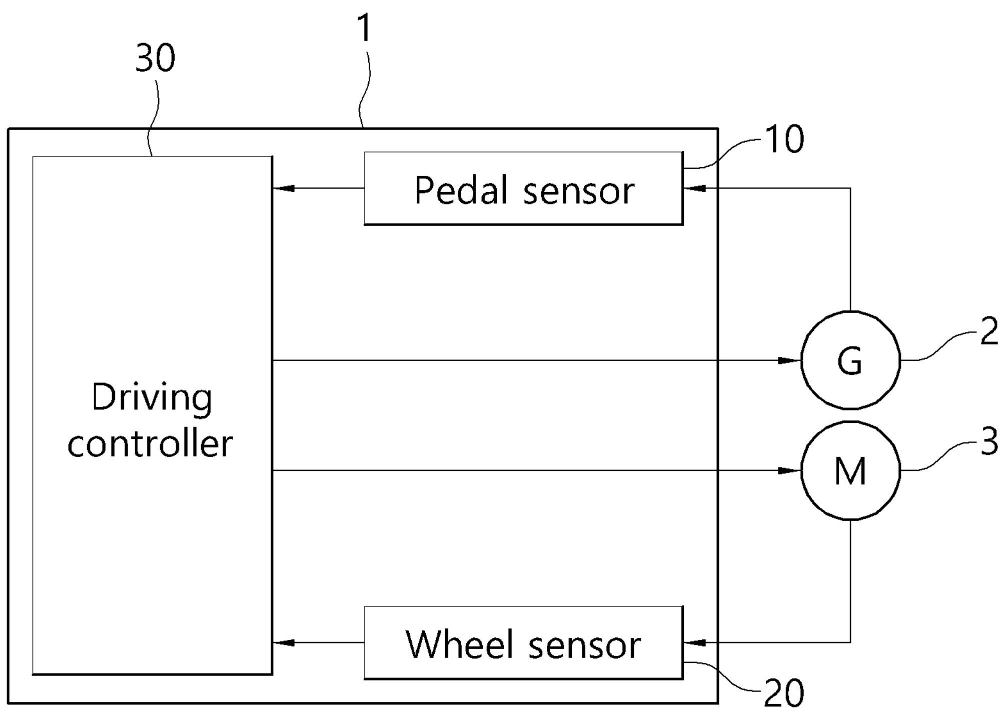
FIG. 1 is a schematic structural diagram of an apparatus for driving an electric bicycle according to a preferred embodiment of the present disclosure.

FIG. 1 is a schematic structural diagram of an apparatus for driving an electric bicycle according to a preferred embodiment of the present disclosure.

The apparatus 1 for driving an electric bicycle according to the present disclosure includes a pedal sensor 10, a wheel sensor 20, and a driving controller 30.

The pedal sensor 10 measures a position or speed of a pedal for rotating a generator 2.

The wheel sensor 20 measures a position or speed of a driving wheel. The driving wheel is connected to the pedal with a chain and can be driven with the assistance of a motor 3, and in the case of an electric bicycle without a chain, it can be driven only by the motor 3.

The driving controller 30 generates a current for driving the motor 3 by the position or speed of the pedal and the position or speed of the driving wheel.

Figure 2:
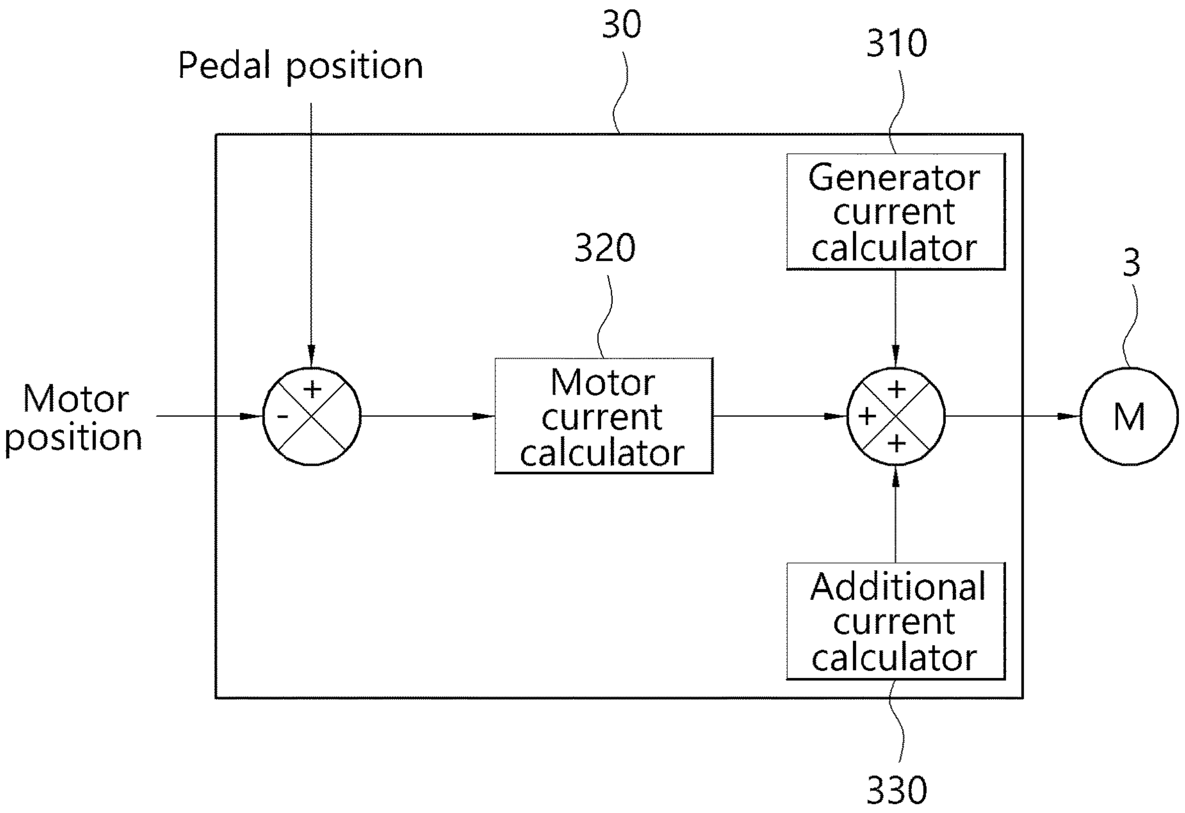
FIG. 2 is a more detailed structural diagram of a driving controller according to a preferred embodiment of the present disclosure.

FIG. 2 is a more detailed structural diagram of a driving controller according to a preferred embodiment of the present disclosure.

The driving controller 30 according to the present disclosure includes a generator current calculator 310, a motor current calculator 320, and an additional current calculator 330. To this end, the driving controller 30 includes one or more processors and memories.

The electric bicycle controls the motor 3 so that the speed of the pedal increases as the speed of the pedal increases, like a general bicycle. To this end, a current for controlling the motor 3 is generated based on a difference between the position or speed of the pedal and the position or speed of the driving wheel.

When the position of the pedal and the position of the driving wheel are used, the motor current calculator 320 determines a current for driving the motor 3 by using the difference between the position of the pedal and the position of the motor 3 connected to the driving wheel. At this time, the same gear ratio as that of a general bicycle can be considered, and the degree of assistance of the motor can be considered according to the driving mode.

In order to apply a boost mode for rapid acceleration here, the generator current calculator 310 may be controlled to generate a larger current compared to the position of the pedal.

Another method of applying the boost mode is to generate, by the additional current calculator 330, an additional current for rapid acceleration to the driving current of the motor 3 determined by the generator current calculator 310 and the motor current calculator 320.

By driving the motor 3 by the finally determined motor driving current, the driving controller 30 can apply the boosting mode.

The determination process is similar in the case of using the pedal speed and the motor speed instead of the pedal position and the motor position. The motor current calculator 320 determines a basic motor 3 driving current by the difference value between the pedal speed and the motor speed, and the generator current calculator 310 and the additional current calculator 330 determine a motor additional current for the boosting mode.

In order to enter the boosting mode for rapid acceleration, the user's intention to enter the boosting mode should first be checked.

In the case of simply entering the boosting mode with the boosting mode button, etc., if the user accidentally touches the button, due to a sudden start, there may be a risk of an accident or the user may feel uncomfortable.

Accordingly, to enter the boosting mode, an algorithm that double or triple checks the user's intention can be applied. For example, the boosting mode may be activated only when the pedaling speed becomes faster than before while pressing and holding the boosting mode button on the human machine interface (HMI) of the electric bicycle for more than 3 seconds. Alternatively, a brake may be applied when a brake lever is pulled for a long time, and the boosting mode may be activated when the pedal is pressed quickly while pulling the brake lever 2 or 3 times in short succession. In a state in which the boosting mode is activated, the driving controller 30 may display or sound on the HMI that the boosting mode is driving.

Upon entering the boosting mode, the driving controller 30 may perform acceleration by determining, by the motor current calculator 320, a basic motor 3 driving current and by generating, by the generator current calculator 310 and the additional current calculator 330, an additional current for driving the motor. For safety, the driving controller 30 may generate the additional current only for a predetermined period of time and stop the boosting mode. In addition, in order to prevent abuse of boosting mode and reduce battery consumption, after using boosting mode once, it may be restricted so that it can be used again after a certain period of time.

The magnitude of the current for boosting generated by the driving controller 30 may vary according to a current driving speed. For example, it generates about 20% additional current at low speed, 30% additional current at high speed, and so on. By generating an additional current in proportion to the current driving speed, the risk of an accident or the user's impact caused by rapid acceleration may be alleviated. Also, it is possible to limit the additional current of the motor 3 so that the speed does not increase beyond a predetermined maximum speed even while generating a 20% or 30% additional current.

Figure 3:
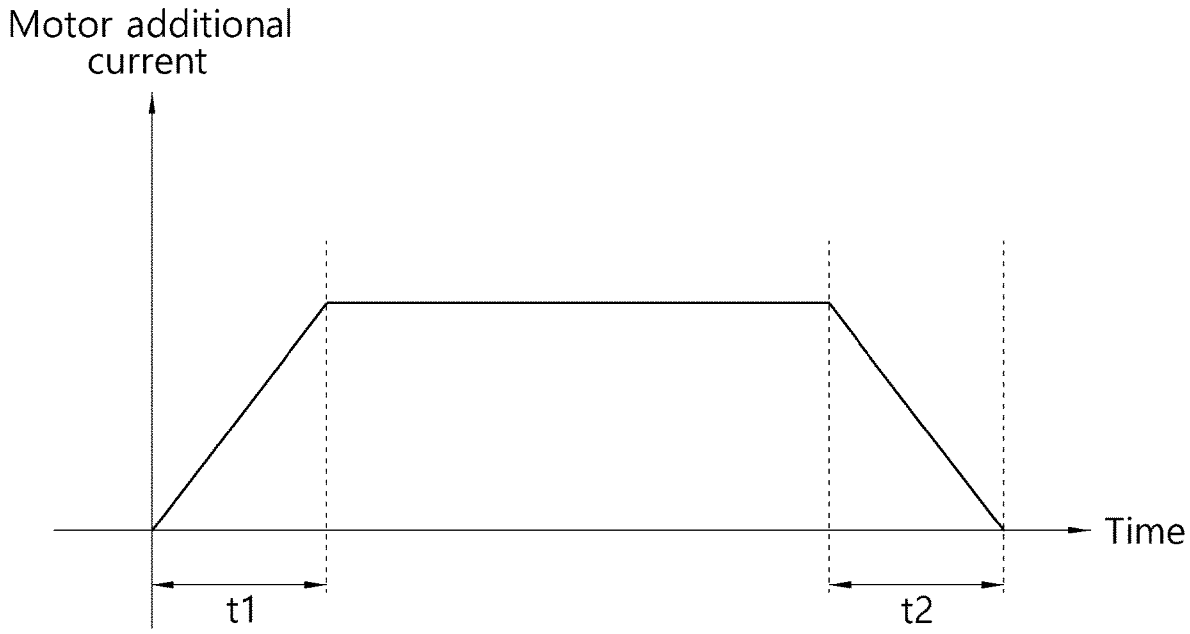
FIG. 3 shows a change aspect in a motor additional driving current according to a preferred embodiment of the present disclosure.

FIG. 3 shows a change aspect in a motor additional driving current according to a preferred embodiment of the present disclosure.

If the motor additional driving current for acceleration is suddenly applied, the electric bicycle may be shocked. Therefore, the added current can be gradually increased and gradually decreased.

As shown in FIG. 3, when the boosting mode starts, it is increased up to the target current for a predetermined first time t1, and the additional current for boosting is reduced to 0 for a predetermined second time t2 before the end of the boosting mode. The amount of the additional current that increases or decreases at the first time or the second time may be linear, as shown in FIG. 3, or may be non-linear like a logarithmic function or an exponential function.

The boosting mode is set to end after a certain period of time, but it may be ended even while the boosting mode is running, according to the user's intention. For example, when the speed of the pedal measured by the pedal sensor 10 is 0 because the user does not step on the pedal, or when the brake is operated by the user operating the brake, the boosting mode may be ended.

Figure 4:
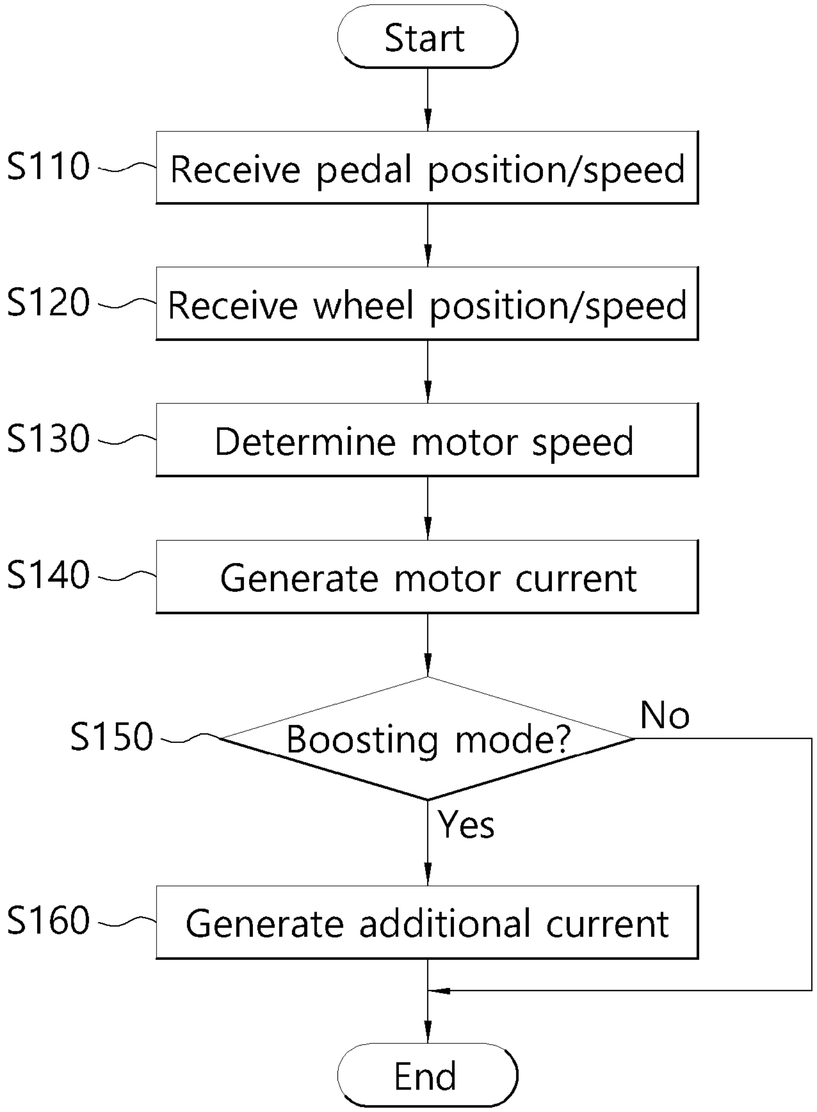
FIG. 4 is a schematic flowchart of a method for driving an electric bicycle according to a preferred embodiment of the present disclosure.

FIG. 4 is a flowchart once again summarizing a method for driving an electric bicycle according to a preferred embodiment of the present disclosure.

For driving the electric bicycle, first, a position or speed of the pedal is received at step S110 and a position or speed of the wheel is received at step S120.

The driving controller 30 determines a speed of the motor 3 for driving the electric bicycle by the difference between the received positions or speeds of the pedal and the driving wheel at step S130, and accordingly, generates a motor driving current at step S140.

It is determined whether the boosting mode is entered by the user's intention at step S150, and if it is the boosting mode, an additional current is generated at step S160.

In order to prevent the user from entering the boosting mode unintentionally, a second or third step of determining the user's intention to boosting may be performed. The details are the same as described above.

The motor additional current for boosting may vary depending on the current driving speed, and for safety reasons, maximum speed may be limited. In addition, in order to prevent sudden boosting, the current can be gradually increased or decreased at the start and end of boosting.

The boosting mode may be set to automatically end after a certain period of time and not operate again for a certain period of time after the end of the boosting mode.

In addition, if the user applies the brake or does not step on the pedal, the boosting mode may be ended early even while the boosting mode is running.

According to the driving apparatus and method for controlling boosting of an electric bicycle of the present disclosure described above, by supplying additional current to the motor when needed, a desired acceleration by a user can be achieved, and a risk caused by a rapid acceleration can be prevented.

Figure 5:
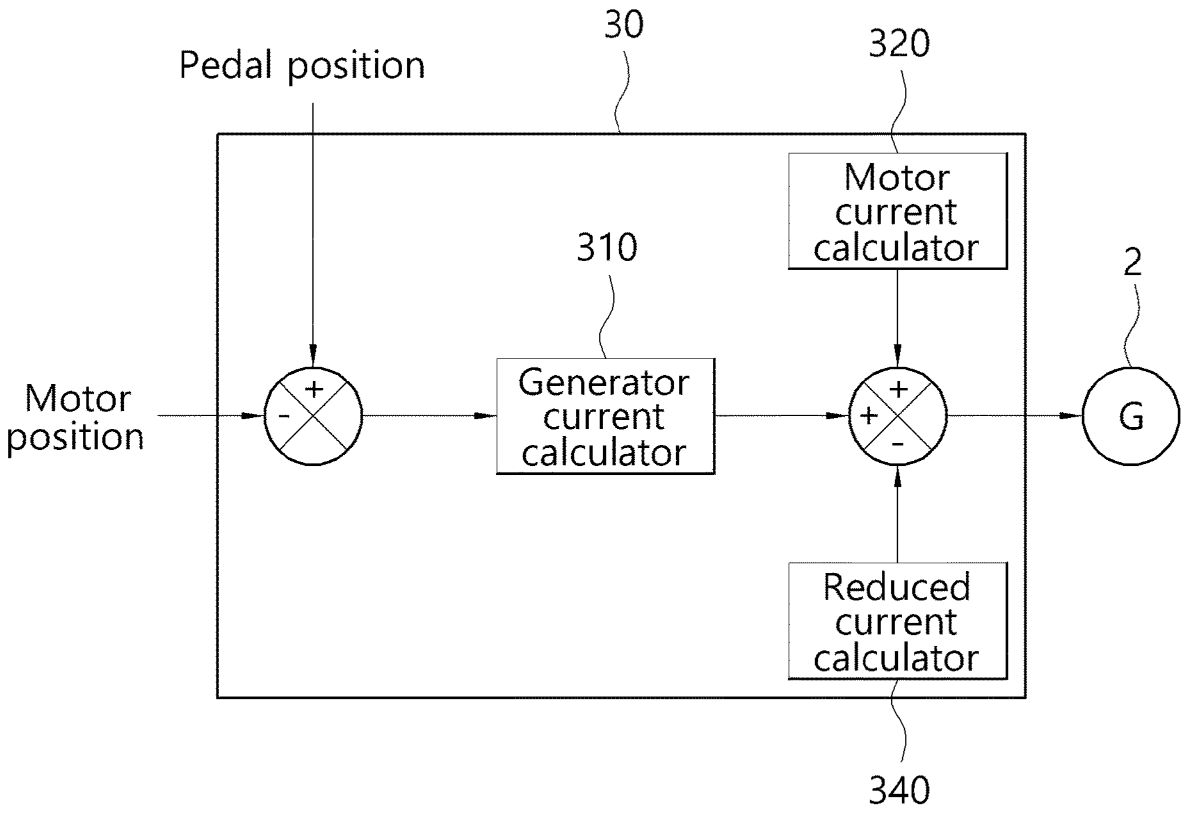
FIG. 5 is a more detailed structural diagram of a driving controller according to another preferred embodiment of the present disclosure.

FIG. 5 is a more detailed structural diagram of a driving controller according to another preferred embodiment of the present disclosure.

The driving controller 30 according to the present disclosure includes a generator current calculator 310, a motor current calculator 320, and a reduced current calculator 340. To this end, the driving controller 30 includes one or more processors and memories.

Electric bicycles require greater driving force in situations such as hills and uphill roads. That is, the force applied to the pedal is required to be greater in a situation such as a hill or an uphill road than on a flat ground. In order to solve this problem, the driving controller 30 according to the present disclosure generates a current for controlling the generator 2 based on the difference between the position or speed of the pedal and the position or speed of the driving wheel.

When the position of the pedal and the position of the driving wheel are used, the generator current calculator 310 determines a current for driving the generator 2 by using the difference between the position of the pedal and the position of the motor 3 connected to the driving wheel. At this time, the same gear ratio as that of a general bicycle can be considered, and the degree of assistance of the motor 3 can be considered according to the driving mode.

In order to apply a boost mode for rapid acceleration here, the motor current calculator 320 may be controlled to generate a larger current compared to the position of the pedal.

Another method of applying the boost mode is to generate, by the reduced current calculator 340, a reduced current for rapid acceleration to the driving current of the generator 2 determined by the generator current calculator 310 and the motor current calculator 320.

By driving the generator 2 by the finally determined generator driving current, the driving controller 30 can apply the boosting mode.

The determination process is similar in the case of using the pedal speed and the motor speed instead of the pedal position and the motor position. The generator current calculator 310 determines a basic generator 2 driving current by the difference between the pedal speed and the motor speed, and the motor current calculator 320 and the reduced current calculator 340 determine a generator reduced current for the boosting mode.

In order to enter the boosting mode for rapid acceleration, the user's intention to enter the boosting mode should first be checked. The details regarding this are the same as described above.

Upon entering the boosting mode, the driving controller 30 may perform acceleration by determining, by the generator current calculator 310, a basic generator 2 driving current and by generating, by the motor current calculator 320 and the reduced current calculator 340, a reduced current for driving the generator. For safety, the driving controller 30 may generate the reduced current only for a predetermined period of time and stop the boosting mode. In addition, in order to prevent abuse of boosting mode and reduce battery consumption, after using boosting mode once, it may be restricted so that it can be used again after a certain period of time.

The magnitude of the current for boosting generated by the driving controller 30 may vary according to a current driving speed. For example, it generates about 20% reduced current at low speed, 30% reduced current at high speed, and so on. By generating a reduced current in proportion to the current driving speed, the risk of an accident or the user's impact caused by rapid acceleration may be alleviated. Also, it is possible to limit the reduced current of the generator 2 so that the speed does not increase beyond a predetermined maximum speed even while generating a 20% or 30% reduced current.

Figure 6:
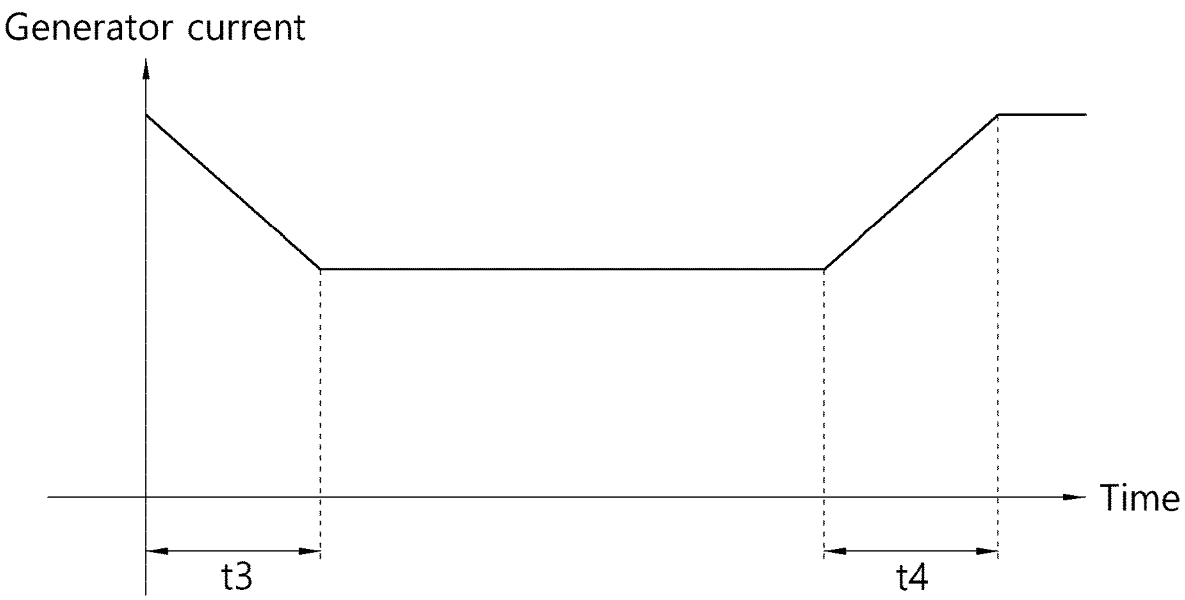
FIG. 6 shows a change aspect in a generator driving current according to another preferred embodiment of the present disclosure.

FIG. 6 shows a change aspect in a generator driving current according to another preferred embodiment of the present disclosure.

If the generator reduced driving current for acceleration is suddenly applied, the electric bicycle may be shocked. Therefore, the generator driving current can be gradually reduced and gradually returned.

As shown in FIG. 6, when the boosting mode starts, it is decreased up to the target current for a predetermined third time t3, and the reduced current for boosting is increased to 0 for a predetermined fourth time t4 before the end of the boosting mode. The amount of the reduced current that increases or decreases at the third time or the fourth time may be linear, as shown in FIG. 6, or may be non-linear like a logarithmic function or an exponential function.

The boosting mode is set to end after a certain period of time, but it may be ended even while the boosting mode is running, according to the user's intention. The details regarding this are the same as described above.

Figure 7:
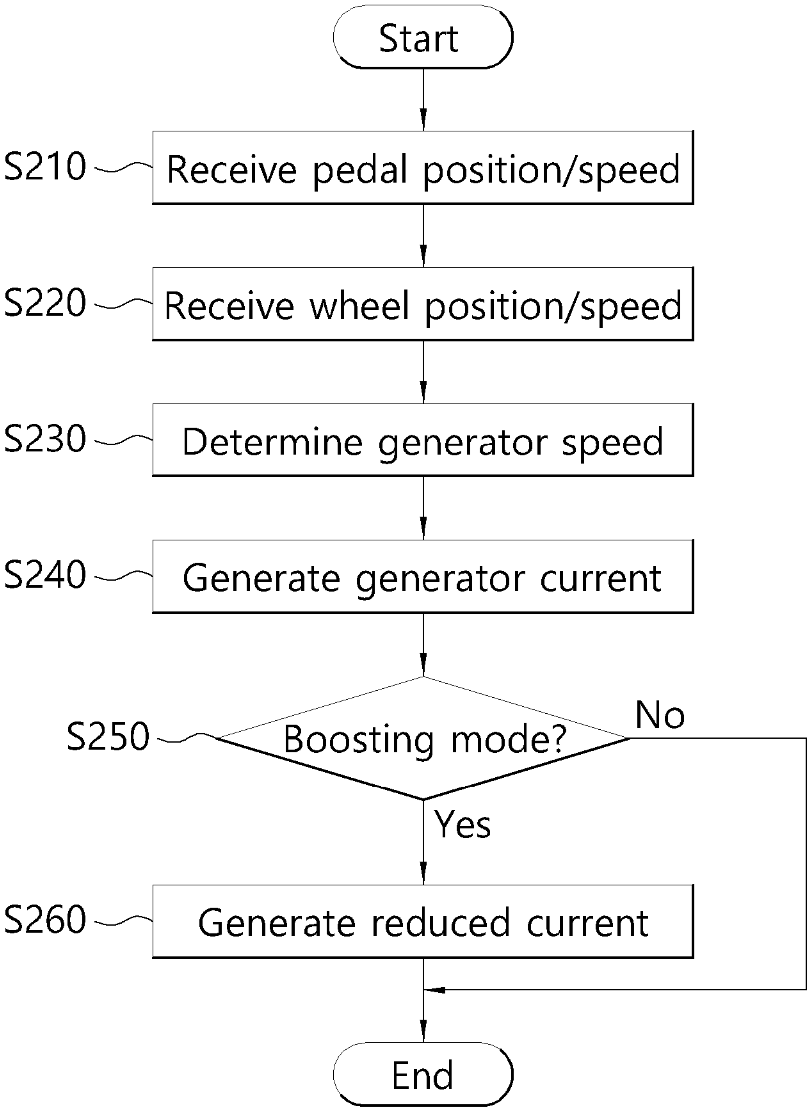
FIG. 7 is a schematic flowchart of a method for driving an electric bicycle according to another preferred embodiment of the present disclosure.

FIG. 7 is a flowchart once again summarizing a method for driving an electric bicycle according to another preferred embodiment of the present disclosure.

For driving the electric bicycle, first, a position or speed of the pedal is received at step S210 and a position or speed of the wheel is received at step S220.

The driving controller 30 determines a speed of the generator 2 for driving the electric bicycle by the difference between the received positions or speeds of the pedal and the driving wheel at step S230, and accordingly, generates a generator driving current at step S240.

It is determined whether the boosting mode is entered by the user's intention at step S250, and if it is the boosting mode, a reduced current is generated at step S260.

In order to prevent the user from entering the boosting mode unintentionally, a second or third step of determining the user's intention to boosting may be performed. The details are the same as described above.

The generator reduced current for boosting may vary depending on the current driving speed, and for safety reasons, maximum speed may be limited. In addition, in order to prevent sudden boosting, the current can be gradually increased or decreased at the start and end of boosting.

The boosting mode may be set to automatically end after a certain period of time and not operate again for a certain period of time after the end of the boosting mode.

In addition, if the user applies the brake or does not step on the pedal, the boosting mode may be ended early even while the boosting mode is running.

According to the driving apparatus and method for controlling boosting of an electric bicycle of the present disclosure described above, by supplying reduced current to the generator when needed, a user can rotate the pedal with less force, and a risk caused by a rapid acceleration can be prevented.

The scope of protection of the present disclosure is not limited to the description and expression of the embodiments explicitly described above. In addition, it is added once again that the scope of protection of the present disclosure may not be limited due to obvious changes or substitutions in the art of the present disclosure.

What is claimed is:

1. An apparatus for driving an electric bicycle, comprising:

a pedal sensor for measuring a position or speed of a pedal;

a wheel sensor for measuring a position or speed of a driving wheel; and a driving controller for controlling a speed of a motor for driving the driving wheel according to a position difference or speed difference between the pedal and the driving wheel;

wherein the driving controller increases a control current of the motor in a boosting mode set by a user's boosting control for a certain period of time compared to a previous driving, wherein the driving controller generates a first additional control current corresponding to a first percentage (%) when the electric bicycle enters the boosting mode at a first speed and generates a second additional control current corresponding to a second percentage (%), which is higher than the first percentage (%), when the electric bicycle enters the boosting mode at a second speed, which is higher than the first speed, wherein the first percentage (%) and the second percentage (%) are defined relative to the control current of the motor used immediately before the electric bicycle enters the boosting mode.

2. The apparatus for driving an electric bicycle of claim 1, wherein the driving controller increases the control current of the motor in proportion to the speed of the electric bicycle in the boosting mode.

3. The apparatus for driving an electric bicycle of claim 1, wherein the driving controller limits the current of the motor so that the speed of the electric bicycle does not exceed a predetermined maximum speed in the boosting mode.

4. The apparatus for driving an electric bicycle of claim 1, wherein the driving controller increases the increasing current of the motor for a predetermined first time after the start of the boosting mode and decreases it for a predetermined second time before the end of the boosting mode.

5. A method for driving an electric bicycle performed by a driving controller of the electric bicycle comprising one or more processors and memories, the method comprising:

measuring a position or speed of a pedal;

measuring a position or speed of a driving wheel;

determining a speed of a motor for driving the driving wheel based on a position difference or a speed difference between the pedal and the driving wheel;

generating a motor current for controlling the motor at the determined speed;

determining whether it is a boosting mode for acceleration; and generating an additional current of the motor for acceleration in response to the determination result being a boosting mode, wherein the generating of the additional current of the motor for acceleration comprises:

generating a first additional control current corresponding to a first percentage (%) when the electric bicycle enters the boosting mode at a first speed and generating a second additional control current corresponding to a second percentage (%), which is higher than the first percentage (%), when the electric bicycle enters the boosting mode at a second speed, which is higher than the first speed, wherein the first percentage (%) and the second percentage (%) are defined relative to the control current of the motor used immediately before the electric bicycle enters the boosting mode.

6. The method for driving an electric bicycle of claim 5, wherein the generating an additional current of the motor comprises generating the additional current of the motor in proportion to the current speed of the electric bicycle.

7. The method for driving an electric bicycle of claim 5, wherein the generating an additional current of the motor limits the additional current of the motor so that the speed of the electric bicycle does not exceed a predetermined maximum speed.

8. The method for driving an electric bicycle of claim 5, wherein the generating an additional current of the motor increases the current of the motor for a predetermined first time after the start of the boosting mode and decreases it for a predetermined second time before the end of the boosting mode.

* * * * *